(12) United States Patent
Babbini et al.

(10) Patent No.: US 10,215,295 B2
(45) Date of Patent: Feb. 26, 2019

(54) VALVE FOR A RECIPROCATING COMPRESSOR

(71) Applicant: Nuovo Pignone Tecnologie Srl, Florence (IT)

(72) Inventors: Alberto Babbini, Florence, IA (US); Gianni Orsi, Florence (IT); Riccardo Maleci, Florence (IT); Federico Puccinelli, Florence (IT)

(73) Assignee: Nuovo Pignone Tecnologie Srl, Florence (IT)

( * ) Notice: Subject to any disclaimer, the term of this patent is extended or adjusted under 35 U.S.C. 154(b) by 0 days.

(21) Appl. No.: 15/576,060

(22) PCT Filed: May 17, 2016

(86) PCT No.: PCT/EP2016/061013
§ 371 (c)(1),
(2) Date: Nov. 21, 2017

(87) PCT Pub. No.: WO2016/188800
PCT Pub. Date: Dec. 1, 2016

(65) Prior Publication Data
US 2018/0163881 A1  Jun. 14, 2018

(30) Foreign Application Priority Data

May 22, 2015  (IT) .................. 102015000016911

(51) Int. Cl.
*F04B 39/10* (2006.01)
*F16K 15/18* (2006.01)
(Continued)

(52) U.S. Cl.
CPC .............. *F16K 15/181* (2013.01); *F04B 7/02* (2013.01); *F04B 39/08* (2013.01);
(Continued)

(58) Field of Classification Search
CPC ..... F04B 39/08; F04B 39/102; F04B 39/1053
See application file for complete search history.

(56) References Cited

U.S. PATENT DOCUMENTS 4,852,608 A * 8/1989 Bennitt ............... F04B 39/1053
                                                137/516.11
4,854,341 A * 8/1989 Bauer ................. F04B 39/1053
                                                137/514
(Continued)

FOREIGN PATENT DOCUMENTS

CA  2 859 277 A1  6/2013
CA  2 859 275 A1  7/2013
(Continued)

OTHER PUBLICATIONS

Buffa, F., Automatic ring valve shutters for automatic ring valves and method for manufacturing said shutters, GE co-pending Application No. FI2013A000243, filed on Oct. 16, 2013.
(Continued)

*Primary Examiner* — Patrick Hamo
(74) *Attorney, Agent, or Firm* — GE Global Patent Operation; Marc A. Vivenzio

(57) ABSTRACT

A valve for a reciprocating compressor comprises a valve body having a seat and a guard; a shutter element placed between the seat and the guard and configured to move between a closed position in which the passage of fluid is prevented and an open position in which the passage of fluid is allowed; an hydraulic apparatus for moving the shutter element between the open and closed positions, the hydraulic apparatus comprising an hydraulic circuit having at least a portion integrated in the valve body.

10 Claims, 5 Drawing Sheets

(51) Int. Cl.
  *F04B 7/02* (2006.01)
  *F04B 39/08* (2006.01)
  *F04B 49/22* (2006.01)
  *F04B 53/10* (2006.01)

(52) U.S. Cl.
  CPC ........ *F04B 39/1053* (2013.01); *F04B 49/225* (2013.01); *F04B 53/10* (2013.01)

(56) References Cited

U.S. PATENT DOCUMENTS

| | | | | |
|---|---|---|---|---|
| 4,869,291 | A * | 9/1989 | Hrabal | F04B 39/1053 137/516.21 |
| 5,052,434 | A * | 10/1991 | Bauer | F04B 39/1033 137/512.1 |
| 5,833,209 | A | 11/1998 | Steinruck | |
| 6,149,400 | A * | 11/2000 | Samland | F04B 39/08 137/516.13 |
| 6,510,868 | B2 * | 1/2003 | Penza | F04B 39/1033 137/516.13 |
| 7,738,763 | B2 | 6/2010 | Ouderkirk et al. | |
| 8,048,815 | B2 | 11/2011 | Kubota et al. | |
| 8,500,420 | B2 * | 8/2013 | Spiegl | F04B 39/08 137/516.23 |
| 8,662,105 | B2 * | 3/2014 | Lagler | F04B 39/08 137/516.11 |
| 9,562,527 | B2 * | 2/2017 | Spiegl | F04B 39/08 |
| 9,581,151 | B2 * | 2/2017 | Spiegl | F04B 39/10 |
| 2007/0295926 | A1 | 12/2007 | Kopecek et al. | |
| 2009/0250644 | A1 | 10/2009 | Kopecek et al. | |
| 2012/0260796 | A1 | 10/2012 | Spiegl et al. | |
| 2013/0160641 | A1 | 6/2013 | Bagagli et al. | |
| 2015/0044081 | A1 | 2/2015 | Babbini et al. | |

FOREIGN PATENT DOCUMENTS

| | | |
|---|---|---|
| CA | 2 859 279 A1 | 7/2013 |
| CA | 2 859 308 A1 | 7/2013 |
| CA | 2 859 316 A1 | 7/2013 |
| EP | 2 194 302 A2 | 6/2010 |
| GB | 262970 A | 12/1926 |
| JP | S60-75782 A | 4/1985 |

OTHER PUBLICATIONS

Tozzi, P., Automatic ring valve, shutters for automatic ring valves, and method for manufacturing said shutters, GE co-pending Application No. FI2014A000246, filed on Nov. 5, 2014.

Italian Search Report and Written Opinion issued in connection with corresponding IT Application No. 102015000016911 dated Jan. 19, 2016.

International Search Report and Written Opinion issued in connection with corresponding PCT Application No. PCT/EP2016/061013 dated Sep. 12, 2016.

* cited by examiner

VALVE FOR A RECIPROCATING COMPRESSOR

FIELD OF INVENTION

The subject matter of the present disclosure relates to a valve for a reciprocating compressor. Reciprocating compressors equipped with such a valve can be employed in process applications including refineries, petro chemicals, fertilizers, refrigeration and air, as well as in the gas and oil industry, for gas re-injection, gas lift, pipeline gas transmission, gas storage and fuel gas bursting.

BACKGROUND OF THE INVENTION

A valve for a reciprocating compressor is known in the state of the art. Such valve comprises a seat and a guard, which are substantially planar grills facing each other and placed substantially parallel to each other. The seat and the guard both have holes. However, those holes mostly do not overlap.

A shutter element is placed between the seat and the guard. The shutter element is in particular designed so that it can cover the holes on the valve seat. With more detail, the shutter element is pushed against the seat by a set of springs acting between the guard and the shutter element itself. The passage of fluid is thus prevented.

When the pressure from the working fluid increases beyond a predetermined threshold, it can then overcome the elastic force of the springs, thus forcing the valve open and allowing the passage of fluid until the pressure decreases below the acting threshold.

This valve, while being fully automatic (as the opening and closing actions are determined only by the pressure difference between the two sides) disadvantageously precludes the possibility of opening and closing itself on preset conditions other than such pressure difference.

In order to overcome such disadvantage the related art provides other devices, such as the one shown in the document US2012/0260796. This valve, while retaining the basic construction of the state of the art valve, also comprises a valve lifter acting on the shutter element and moved by an electromagnetic linear motor. Such valve lifter can only open the valve, as it relies on the spring for closing it.

Disadvantageously, such valve is exceedingly complex, thus potentially unreliable. Also, this type of valve needs more space inside the cylinder than the fully automatic version.

Document U.S. Pat. No. 6,149,400 describes a suction valve of the plate-type of construction, comprising a valve plate which is actuated by an electromagnet arranged in a valve catcher. Such design however implies having an electric circuit in close proximity to the process gas, which may itself be inflammable or explosive. Therefore, this kind of valve cannot be safely be employed in such cases.

BRIEF DESCRIPTION OF THE INVENTION

A first embodiment of the invention therefore relates to a valve for a reciprocating compressor. Such valve comprises a valve body, wherein the valve body comprises a seat and a guard. The valve body also defines a valve plane. The seat and the guard develop substantially parallel to the valve plane.

The valve also comprises a shutter element placed between the seat and the guard. The shutter element also develops substantially parallel to the valve plane. The shutter element is also configured to move between a closed position, in which the passage of fluid is prevented, and an open position, in which the passage of fluid is allowed.

The valve also comprises a hydraulic apparatus for moving the shutter element at least between the open and the closed positions. The hydraulic apparatus comprises a hydraulic circuit having at least a portion integrated in the valve body.

Another embodiment of the invention relates to a valve, which comprises: a valve body; a hydraulic circuit, at least a portion of which is integrated within the valve body; and a shutter element inside the valve body and configured to move between a closed position in which a passage of fluid is prevented and at least an intermediate position in which the passage of fluid is allowed or partially prevented, wherein the hydraulic circuit is coupled with the shutter element.

In a further embodiment, the valve body also comprises: a seat; and a guard, wherein the shutter element is between the seat and the guard.

Such valves are much more compact than the electromagnetic actuated type, and provide increased operational flexibility.

BRIEF DESCRIPTION OF THE DRAWINGS

Further details and specific embodiments will refer to the attached drawings, in which.

DETAILED DESCRIPTION OF THE INVENTION

Figure 1:
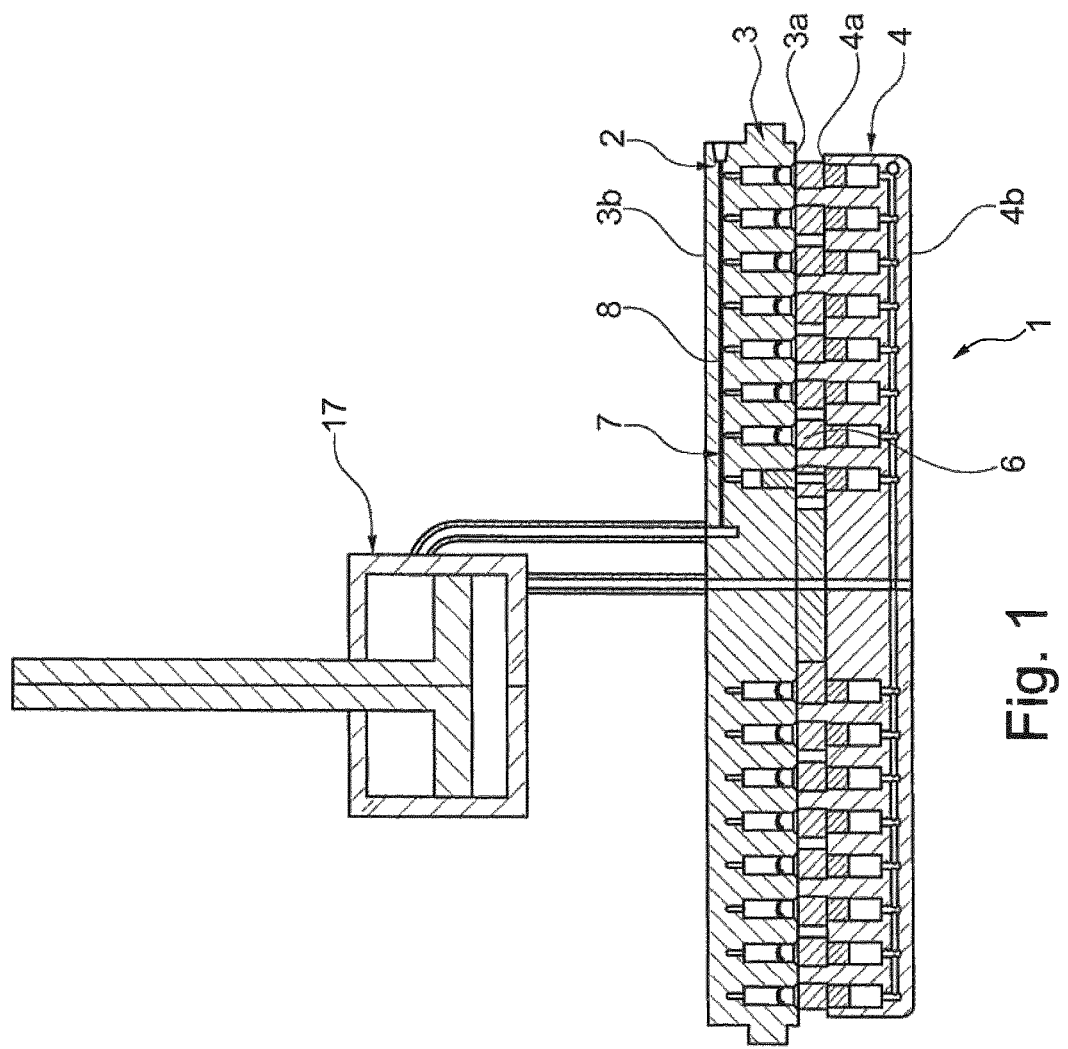
FIG. 1 is a side sectional view of a valve for a reciprocating compressor.

The following description of exemplary embodiments refer to the accompanying drawings. The same reference numbers in different drawings identify the same or similar elements. The following detailed description does not limit the invention. Instead, the scope of in an embodiment defined by the appended claims.

The following disclosure describes in detail a valve of the type generally applied to a cylinder of a reciprocating compressor. This valve opens and closes in order to let process fluid in and out of the cylinder. Also, the opening and closing of the valve can be actively controlled, i.e. it is a so called "active valve".

With reference to the attached drawings, with the number 1 is indicated a valve for a reciprocating compressor according to an embodiment of the present invention.

The valve 1 comprises a valve body 2. The valve body 2 is made so that it can be inserted in a cylinder 22 of a reciprocating compressor 21.

Figure 2:
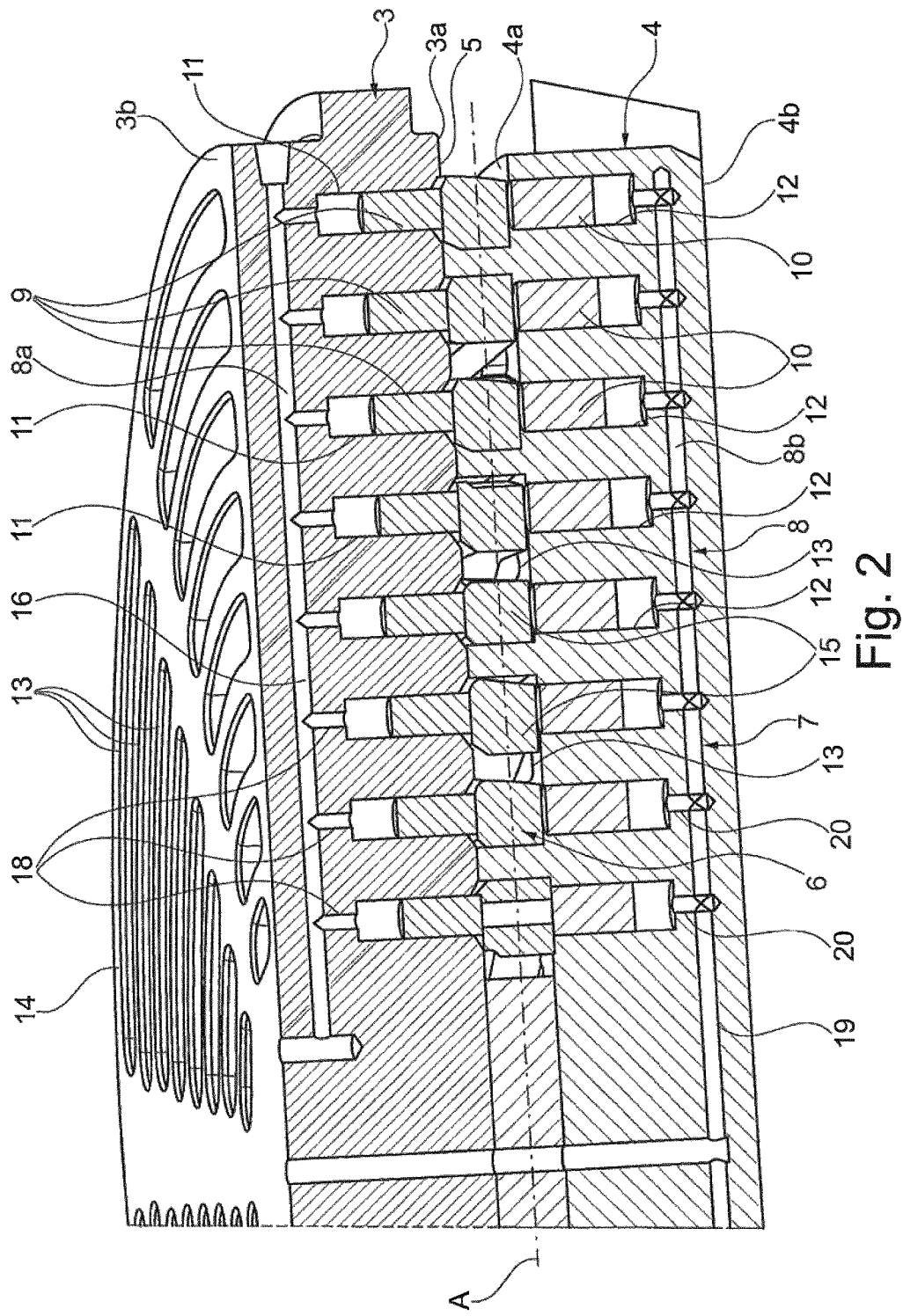
FIG. 2 is a perspective sectional view of a detail of the valve of FIG. 1.
Figure 3:
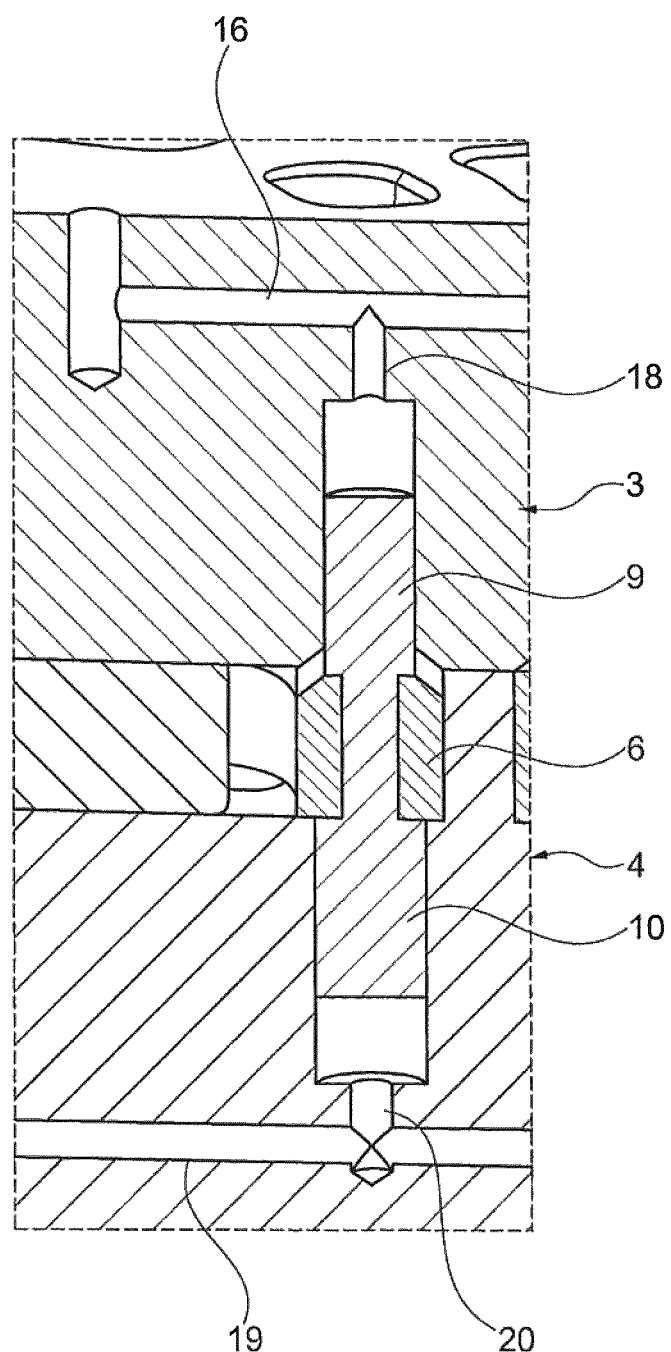
FIG. 3 is a detail sectional view of a valve for a reciprocating compressor.
Figure 4:
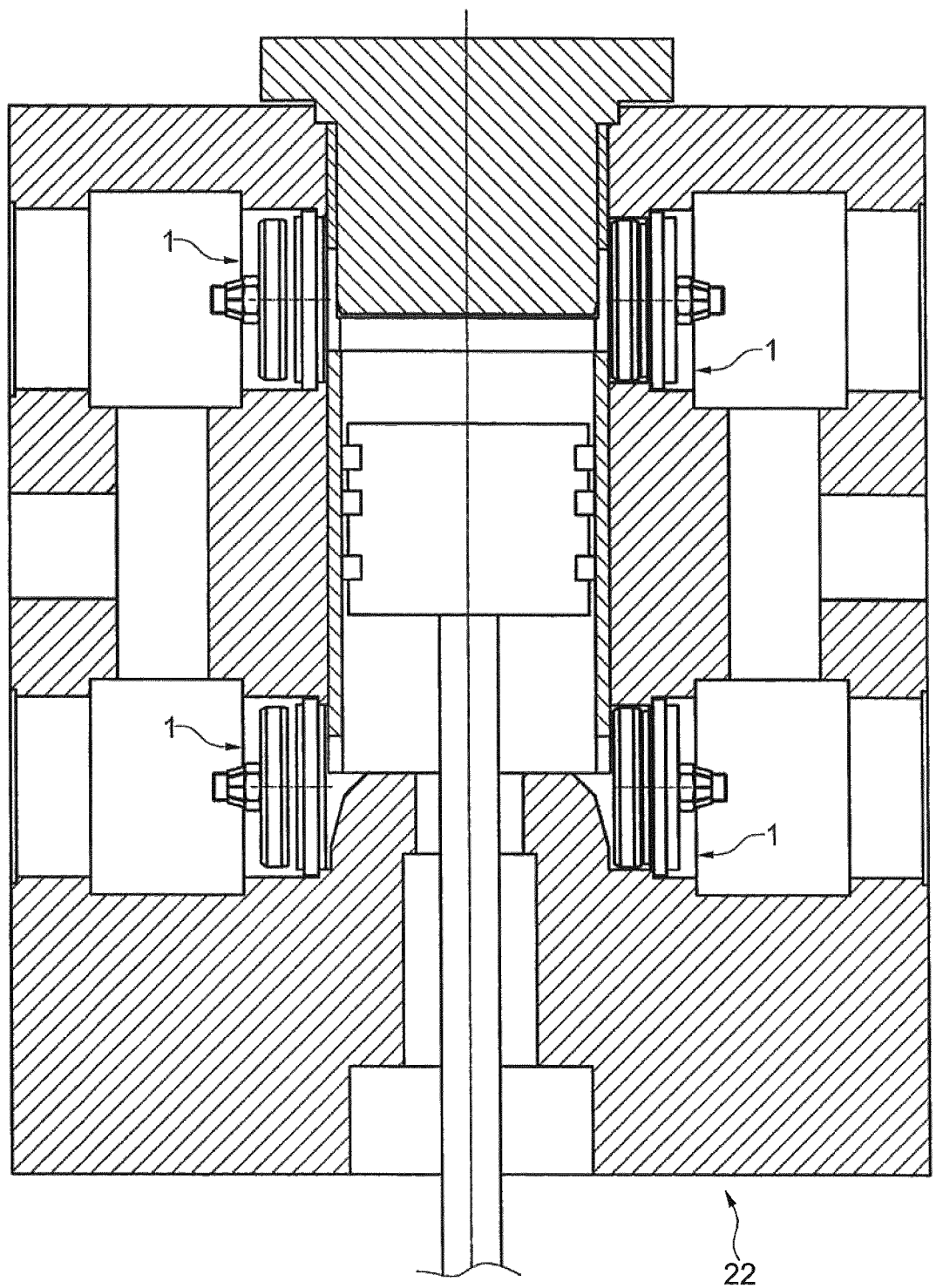
FIG. 4 is a sectional view of a cylinder of a reciprocating compressor comprising the valve of FIGS. 1-3.
Figure 5:
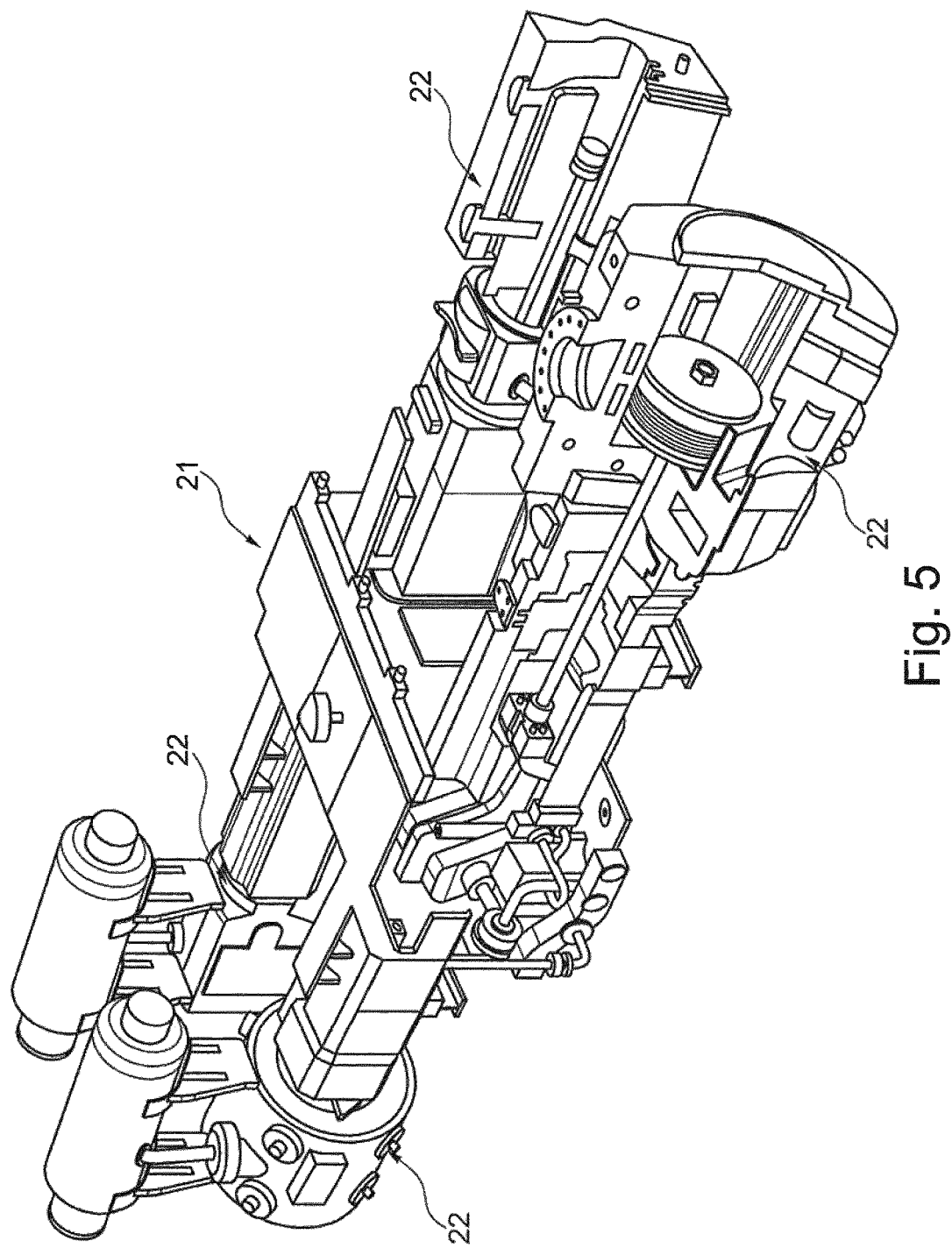
FIG. 5 is a perspective view of a compressor comprising the cylinder of FIG. 4.

More in detail, the valve body 2 comprises a seat 3 and a guard 4. The seat 3 and the guard 4 define a valve plane "A", which will be used as a reference in the following part of the present disclosure. Indeed, both the seat 3 and the guard 4 develop substantially parallel to the valve plane "A". With reference to FIG. 2, the seat 3 and the guard 4 are both shaped as perforated plates, separated by a gap 5. In other words, the seat 3 and the guard 4 have each a plurality of holes 13. Each hole 13 is shaped as an arc, being at a predetermined distance from the center and extending along a portion of circumference. Again with reference to FIG. 2, it is to be noted that the holes 13 from the seat 3 generally do not face the holes 13 of the guard 4. Other known types of patterns for the holes 13 can be employed in both the seat 3 and the guard 4.

More in detail, the seat 3 has an inner face 3a and an outer face 3b. The guard 4 has an inner face 4a and an outer face 4b. The gap 5 is defined between the inner faces 3a, 4a.

A shutter element 6 is placed between the seat 3 and the guard 4. The shutter element 6 develops substantially parallel to the valve plane "A". The shutter element 6 is configured to move between a closed position in which the passage of fluid is prevented and an open position in which the passage of fluid is allowed inside the valve 1.

With additional detail, the shutter element 6 comprises a grid 14. The grid 14 itself comprises a plurality of covers 15 which face the holes 13 on the seat. Therefore, in the closed position, the shutter element is in contact with the seat 3, so that the covers 15 block the holes 13 of the seat 3. In the open position, the shutter element 6 detaches from the seat 3, so that the fluid may flow from the holes 13 of the seat 3, around the covers 15 of the shutter element 6 and to the holes 13 of the guard 4. Also, as it will be clear from a following part of this disclosure, the fluid can also flow in the reverse direction, i.e. from the holes 13 of the guard 4 to the holes 13 of the seat 3.

In an alternative embodiment, not shown in the drawings, the shutter element 6 may comprise, in place of the grid 14, a plurality of distinct rings, arranged so that that can move independently one from each other.

In a further embodiment of the invention, the shutter element 6 can be configured to move between the closed position and at least an intermediate position. In this way, it is possible to allow the passage of fluid at a reduced rate with respect to a fully open position.

The valve 1 also comprises a hydraulic apparatus 7 for moving the shutter element 6. Specifically, the hydraulic apparatus 7 can move the shutter element 6 at least between the open and closed positions. In particular, the hydraulic apparatus 7 comprises a hydraulic circuit 8 of which at least a portion 8a, 8b is integrated in the valve body 8. In detail, the hydraulic circuit 8 comprises a first portion 8a integrated in the seat 3. Similarly, the hydraulic circuit 8 comprises a second portion 8b which is integrated in the guard 4. More detail on the hydraulic circuit 8 will be given in a following part of the present disclosure.

The hydraulic apparatus 7 comprises a plurality of pistons 9, 10. Each piston 9, 10 is at least partially inserted into a respective housing 11, 12 inside the valve body 2. Each piston 9, 10 is also placed in contact with the shutter element 6.

With additional detail, a first set of housings 11 is provided inside the seat 3. The hydraulic apparatus 7 comprises a first set of pistons 9, each inserted into a respective housing 11 of the first set.

A second set of housings 12 is provided inside the guard 4. The hydraulic apparatus 7 comprises a second set of pistons 10, each inserted into a respective housing 12 of the second set.

It is to be noted that, according to the embodiment of invention shown in FIG. 2, each piston 9 of the first set is placed opposite to a piston 10 of the second set with respect to the shutter element 6.

Indeed, as shown in a further embodiment of the invention, each piston 9 of the first set can be joined to a corresponding piston 10 from the second set. With more detail, in this case the pistons 9, 10 may either be constructed as a single piece, or constructed as separate pieces and then joined later.

In detail, the aforementioned first portion 8a of the hydraulic circuit 8 comprises a first main duct 16, which can be placed in fluid communication with an hydraulic actuator 17, as shown for example in FIG. 1. The hydraulic actuator 17 is not itself part of the valve 1. However, a further embodiment of the present invention may comprise such hydraulic actuator 17 together with a suitable embodiment of the valve 1.

The first portion 8a also comprises a plurality of first branching ducts 18, each in fluid communication with both the first main duct 16 and with a respective housing 11 of the first set. It is to be noted that, if required by the shape of the seat 3 and by the arrangement of the housings 11 of the first set, the hydraulic circuit 8 may comprise more than one first main duct 16.

Also, the second portion 8b of the hydraulic circuit 8 comprises a second main duct 19, which can be placed in fluid communication with the hydraulic actuator 17. The second portion 8b also comprises a plurality of second branching ducts 20, each in fluid communication with both the second main duct 19 and with a respective housing 12 of the second set. If required by the shape of the guard 4 and by the arrangement of the housings 12 of the second set, the hydraulic circuit 8 may comprise more than one second main duct 19.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A valve for a reciprocating compressor comprising:
   a valve body comprising a seat and a guard and defining a valve plane, the seat and the guard developing substantially parallel to the valve plane;
   a shutter element placed between the seat and the guard and developing substantially parallel to the valve plane, the shutter element configured to move between a closed position in which the passage of fluid is prevented and an open position in which the passage of fluid is allowed; and
   a hydraulic apparatus to move the shutter element at least between the open and the closed position, the hydraulic apparatus comprising a hydraulic circuit having at least a portion integrated in the valve body such that a first portion of the hydraulic circuit is integrated in the seat and a second portion of the hydraulic circuit is integrated in the guard.

2. The valve according to claim 1, wherein the hydraulic apparatus comprises a plurality of pistons, each piston being at least partially inserted into a respective housing inside the valve body and in contact with the shutter element.

3. The valve according to claim 2, wherein a set of housings is provided inside the seat, and each piston of a subset of the plurality pistons is inserted into a respective housing of the first set of housings.

4. The valve according to claim 1, wherein the shutter element is configured to also move between the closed position and at least an intermediate position allowing the passage of fluid at a reduced rate with respect to the open position.

5. A cylinder for a reciprocating compressor, the cylinder comprising at least a valve according to claim 1.

6. A reciprocating compressor comprising a valve according to claim 1.

7. A valve for a reciprocating compressor comprising:
a valve body comprising a seat and a guard and defining a valve plane, the seat and the guard developing substantially parallel to the valve plane;
a shutter element placed between the seat and the guard and developing substantially parallel to the valve plane, the shutter element configured to move between a closed position in which the passage of fluid is prevented and an open position in which the passage of fluid is allowed; and
a hydraulic apparatus to move the shutter element at least between the open and the closed position, the hydraulic apparatus comprising a hydraulic circuit having at least a portion integrated in the valve body including a first portion integrated in the seat, and a plurality of pistons with each piston of the plurality of pistons at least partially inserted into a respective housing inside the valve body and in contact with the shutter element,
wherein a set of housings is provided inside the guard, and each piston of a subset of the plurality of pistons is inserted into a respective housing of the set of housings.

8. A valve for a reciprocating compressor comprising:
a valve body comprising a seat and a guard and defining a valve plane, the seat and the guard developing substantially parallel to the valve plane;
a shutter element placed between the seat and the guard and developing substantially parallel to the valve plane, the shutter element configured to move between a closed position in which the passage of fluid is prevented and an open position in which the passage of fluid is allowed; and
a hydraulic apparatus to move the shutter element at least between the open and the closed position, the hydraulic apparatus comprising a hydraulic circuit having at least a portion integrated in the valve body including a first portion integrated in the seat, and a plurality of pistons with each piston of the plurality of pistons at least partially inserted into a respective housing inside the valve body and in contact with the shutter element;
wherein a first set of housings is provided inside the seat and a second set of housing is provided inside the guard, and each piston of a first subset of the plurality of pistons is inserted into a respective housing of the first set of housings and each piston of a second subset of the plurality of pistons is inserted into a respective housing of the second set of housings.

9. The valve according to claim 8, wherein each piston of the first subset is opposite to a corresponding piston of the second subset with respect to the shutter element.

10. The valve according to claim 9, wherein each piston of the first subset is joined to a corresponding piston of the second subset.

* * * * *